(12) United States Patent
Yip et al.

(10) Patent No.: US 10,447,818 B2
(45) Date of Patent: Oct. 15, 2019

(54) METHODS, REMOTE ACCESS SYSTEMS, CLIENT COMPUTING DEVICES, AND SERVER DEVICES FOR USE IN REMOTE ACCESS SYSTEMS

(71) Applicant: Qatar Foundation, Doha (QA)

(72) Inventors: William Yip, Doha (QA); Simon Ponsford, Doha (QA)

(73) Assignee: Qatar Foundation, Doha (QA)

( * ) Notice: Subject to any disclaimer, the term of this patent is extended or adjusted under 35 U.S.C. 154(b) by 394 days.

(21) Appl. No.: 14/646,265

(22) PCT Filed: Nov. 21, 2012

(86) PCT No.: PCT/EP2012/073241
§ 371 (c)(1),
(2) Date: May 20, 2015

(87) PCT Pub. No.: WO2014/079491
PCT Pub. Date: May 30, 2014

(65) Prior Publication Data
US 2015/0296051 A1    Oct. 15, 2015

(51) Int. Cl.
*H04L 29/06* (2006.01)
*G06F 9/451* (2018.01)
*G06F 8/61* (2018.01)
*G06F 9/48* (2006.01)
*G06F 9/50* (2006.01)
(Continued)

(52) U.S. Cl.
CPC .......... *H04L 67/40* (2013.01); *G06F 3/04817* (2013.01); *G06F 3/04842* (2013.01); *G06F 8/61* (2013.01); *G06F 9/453* (2018.02); *G06F 9/4843* (2013.01); *G06F 9/5027* (2013.01)

(58) Field of Classification Search
CPC ....................................................... H04L 67/40
See application file for complete search history.

(56) References Cited

U.S. PATENT DOCUMENTS 5,475,860 A * 12/1995 Ellison .................. G06F 13/124
709/212
5,838,906 A * 11/1998 Doyle .................... G06F 9/5027
345/419
(Continued)

FOREIGN PATENT DOCUMENTS

EP        1215573       6/2002
EP        1215573 A1 *  6/2002  ............. G06F 9/547
(Continued)

*Primary Examiner* — Ondrej C Vostal
(74) *Attorney, Agent, or Firm* — Martin & Ferraro, LLP

(57) ABSTRACT

A method of managing the execution of a computer program in a remote access system, comprising: connecting a client computing device to a server device; receiving a request from the client computing device to operate a computer program; determining a device on which to execute the computer program; and executing the computer program on the server device or the client computing device according to the determination, the computer program being executable on both the client computing device and the server device respectively. Furthermore: a method for selectively remotely installing programs; a method for remote access and assistance; a method for monitoring a remote user's activity; a method for distributing group policies.

11 Claims, 5 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 6,119,166 A * | 9/2000 | Bergman | H04L 29/06 709/232 |
| 6,615,253 B1 * | 9/2003 | Bowman-Amuah | G06F 17/30902 707/999.1 |
| 7,627,664 B2 * | 12/2009 | Sutou | H04L 29/06 709/203 |
| 8,060,656 B2 * | 11/2011 | Hanson | H04L 1/1887 709/227 |
| 9,674,562 B1 * | 6/2017 | Spracklen | H04N 21/242 |
| 2003/0050062 A1 * | 3/2003 | Chen | H04L 29/06027 455/435.1 |
| 2003/0229900 A1 * | 12/2003 | Reisman | G06F 17/30873 725/87 |
| 2004/0044772 A1 | 3/2004 | Harkin | |
| 2004/0139156 A1 * | 7/2004 | Matthews | G09B 7/00 709/204 |
| 2004/0165592 A1 * | 8/2004 | Chen | H04L 12/2856 370/395.1 |
| 2004/0225425 A1 * | 11/2004 | Kindo | G08G 1/0969 701/36 |
| 2005/0091343 A1 | 4/2005 | Murray, Jr. | |
| 2005/0256952 A1 * | 11/2005 | Mouhanna | H04L 41/0803 709/223 |
| 2006/0242105 A1 | 10/2006 | Shur et al. | |
| 2006/0271637 A1 * | 11/2006 | McKeon | H04L 67/08 709/217 |
| 2007/0133780 A1 * | 6/2007 | Berner | H04M 3/5166 379/265.01 |
| 2007/0174410 A1 * | 7/2007 | Croft | G06F 3/1415 709/208 |
| 2008/0172574 A1 * | 7/2008 | Fisher | G06Q 10/06 714/25 |
| 2009/0210369 A1 | 8/2009 | Shao et al. | |
| 2009/0248794 A1 * | 10/2009 | Helms | H04L 12/2861 709/203 |
| 2009/0328182 A1 * | 12/2009 | Malakapalli | H04L 63/0838 726/11 |
| 2010/0191609 A1 | 7/2010 | Hodgetts et al. | |
| 2010/0325258 A1 * | 12/2010 | Carpenter | G06F 11/3414 709/224 |
| 2011/0022642 A1 | 1/2011 | deMilo et al. | |
| 2011/0055413 A1 | 3/2011 | Lobsenz | |
| 2011/0142423 A1 | 6/2011 | Horibe et al. | |
| 2011/0153716 A1 * | 6/2011 | Malakapalli | G06F 9/4445 709/203 |
| 2011/0209221 A1 | 8/2011 | Hanson et al. | |
| 2011/0276699 A1 * | 11/2011 | Pedersen | H04L 45/24 709/227 |
| 2012/0092277 A1 * | 4/2012 | Momchilov | G06F 3/038 345/173 |
| 2012/0102549 A1 * | 4/2012 | Mazzaferri | G06F 21/6218 726/4 |
| 2012/0129503 A1 | 5/2012 | Lindeman et al. | |
| 2012/0221668 A1 | 8/2012 | Chen et al. | |
| 2012/0226742 A1 * | 9/2012 | Momchilov | G06F 3/1454 709/203 |
| 2012/0311630 A1 * | 12/2012 | Tritt | H04M 11/08 725/37 |
| 2013/0103973 A1 * | 4/2013 | Werth | G06F 9/5072 714/2 |
| 2013/0110261 A1 * | 5/2013 | Lee | H04L 12/2814 700/23 |
| 2013/0125009 A1 * | 5/2013 | DeLuca | H04L 67/08 715/740 |
| 2013/0166622 A1 * | 6/2013 | Arunachalam | G06F 9/5027 709/202 |
| 2013/0262560 A1 * | 10/2013 | Ivashin | G06F 3/1454 709/203 |
| 2013/0268689 A1 * | 10/2013 | Leucht-Roth | H04L 1/0079 709/232 |
| 2014/0208393 A1 | 7/2014 | Yasukawa et al. | |
| 2015/0304237 A1 | 10/2015 | Yip et al. | |

FOREIGN PATENT DOCUMENTS

| | | | |
|---|---|---|---|
| GB | 2315891 A * | 2/1998 | G06F 17/30899 |
| WO | 2004/044756 | 5/2004 | |
| WO | WO 2012/148683 A2 | 11/2012 | |

* cited by examiner

METHODS, REMOTE ACCESS SYSTEMS, CLIENT COMPUTING DEVICES, AND SERVER DEVICES FOR USE IN REMOTE ACCESS SYSTEMS

This is a National Phase Application under 35 USC 371 of PCT/EP2012/073241 filed Nov. 21, 2012 (published on May 30, 2014 as WO 2014/079491), which is incorporated herein by reference.

BACKGROUND

The present invention relates to systems and methods of managing a remote access system, and the like.

Networks providing terminal services, in which a client computing device is connected to a central server to access data files and/or applications, are known. Microsoft® Corporation of Redmond, Wash., USA, provides a protocol for allowing users of remote client terminals, having limited resources, to access a central server. Remote Desktop Protocol (RDP), by Microsoft® Corporation provides users of client computing devices with a graphical interface to another computer (such as a server, for example). This enables each of a plurality of users to use a respective client computing device with relatively limited processing capabilities, memory and/or storage, to connect to a server that provides greater resources, using a shell running within the operating system of the client computing device.

Centralised computing systems, in which the majority of processing takes place on the central server, provide greater control and monitoring over the activities of users. If a client computing device breaks down, all of the files and applications available on that machine are still available to the user by accessing the central server from a different client computing device. Thus, such systems are robust.

Over time, however, is has become less common to provide client computing devices with limited processing power due to a reduction in the cost of purchasing conventional desktop/laptop computers each having their own independent operating system and computing resources (such as processing power, memory and storage capabilities). By providing users with independent computing devices (such as a conventional desktop/laptop), several problems associated with centralised computing systems have been reduced. For example, if all files and/or applications are stored only on the central server rather than a client terminal, and the central server breaks down, users cannot access those files and/or applications and the client computing devices are rendered useless. However, for the purposes of monitoring and/or controlling users' activities, sharing file access, and providing access to applications with expensive licensing restrictions (i.e. that cannot feasibly be installed on a plurality of independent computing devices due to the associated cost of doing so), some aspects of centralised computing systems remain advantageous.

Providing client computing devices, in a centralised computing system, with independent computing resources and their own operating systems and applications, causes further complexity for system administrators.

For example, each client computing device may have different resources available to it and be running under different operating conditions. This can make the provision of support services difficult.

Administrators may be able to view the users' activities where operations are carried out on the central server through a client computing device, but cannot easily view the actions of the user in relation to their client computing device which do not use the central server. Furthermore, tracking an individual user's activities on both a client computing device and a central server can be complicated.

In addition, certain tasks may be more efficiently performed using the independent computing resources (such as processing resources, graphics resources and network resources) of the client computing device rather than using the resources of the central server.

Other problems associated with the use of a centralised computing system with client computing devices with their own computing resources, include security issues for sensitive data copied from the central server to the client computing devices, access control to the resources of the central server, and security issues due to limited monitoring for malicious programs on client computing devices.

The present invention seeks to ameliorate one or more problems associated with the prior art.

SUMMARY OF THE INVENTION

An aspect of the present invention provides a method of managing access to a location indicated by a link in a remote access system, the method comprising: executing a first computer program using one or more resources of a client computing device or a server device, the execution of the first computer program resulting in the presentation of a link; receiving an instruction to access a storage location indicated by the link; determining whether to access the storage location indicated by the link using one or more resources of the client computing device or the server device based on one or more factors; and accessing the storage location indicated by the link using one or more resources of the client computing device or the server device in accordance with the determination.

The one or more factors may include one or more of: the accessibility of the storage location to the client computing device and the server device; the expected access speed for data stored at the storage location by the client computing device and the server device; the current available resources of the client computing device and the server device; a type of computer file located at the storage location; the availability, on the client computing device and the server device, of a computer program suitable to read, write, or execute the data stored at the storage location; and a security requirement associated with the storage location and/or the client computing device and/or the server device.

The link may be a uniform resource identifier.

The link may be a uniform resource locator which indicates the location of a computer file on a server.

The server may be accessible to the client computing device and/or the server device through the Internet.

The link may be a logical address of a computer file which is accessible to the client computing device and/or the server device through a network connection associated therewith.

The logical address of the computer file may be inaccessible to one of the client computing device and the server device.

Executing the first computer program may comprise executing the first computer program using one or more resources of the client computing device.

Determining whether to access the storage location indicated by the link using one or more resources of the client computing device or the server device may be performed by the client computing device or the server device.

One or more resources of the server device may be used to access the storage location indicated by the link, and the method may further comprise the transmission of at least part of the link to the server device from the client computing device.

Executing the first computer program may comprise executing the first computer program using one or more resources of the server device.

Determining whether to access the storage location indicated by the link may be performed by the server device.

One or more resources of the client computing device may be used to access the storage location indicated by the link, and the method may further comprise the transmission of at least part of the link to the client computing device from the server device.

The link may be a link to a multimedia file.

The link may be a link to a webpage.

The accessing of the storage location indicated by the link may cause the execution of a second computer program using one or more resources of the client computing device or the server device in accordance with the determination.

Another aspect of the present invention provides a remote access system comprising: a client computing device; a server device communicatively coupled to the client computing device, wherein system is configured to: execute a first computer program using one or more resources of the client computing device or the server device, the execution of the first computer program resulting in the presentation of a link; receive an instruction to access a storage location indicated by the link; determine whether to access the storage location indicated by the link using one or more resources of the client computing device or the server device based on one or more factors; and access the storage location indicated by the link using one or more resources of the client computing device or the server device in accordance with the determination.

The one or more factors may include one or more of: the accessibility of the storage location to the client computing device and the server device; the expected access speed for data stored at the storage location by the client computing device and the server device; the current available resources of the client computing device and the server device; a type of computer file located at the storage location; the availability, on the client computing device and the server device, of a computer program suitable to read, write, or execute the data stored at the storage location; and a security requirement associated with the storage location and/or the client computing device and/or the server device.

The link may be a uniform resource identifier.

The link may be a uniform resource locator which indicates the location of a computer file on a server.

The server may be accessible to the client computing device and/or the server device through the Internet.

The link may be a logical address of a computer file which is accessible to the client computing device and/or the server device through a network connection associated therewith.

The logical address of the computer file may be inaccessible to one of the client computing device and the server device.

The system may be configured to execute the first computer program using one or more resources of the client computing device.

The client computing device or server device may be configured to determine whether to access the storage location indicated by the link using one or more resources of the client computing device or the server device.

The client computing device may be configured to transit of at least part of the link to the server device.

The system may be configured to execute the first computer program using one or more resources of the server device.

The server device may be configured to determine whether to access the storage location indicated by the link using one or more resources of the client computing device or the server device.

The server device may be configured to transit of at least part of the link to the client computing device.

The link may be a link to a multimedia file.

The link may be a link to a webpage.

The system may be further configured to execute of a second computer program using one or more resources of the client computing device or the server device in accordance with the determination in response to access of the storage location indicated by the link.

Another aspect of the present invention provides a method of operating a client computing device in a remote access system, the client computing device being connected to a server device, the method comprising: executing a first computer program using one or more resources of the client computing device, the execution of the first computer program resulting in the presentation of a link; receiving an instruction to access a storage location indicated by the link; determining whether to access the storage location indicated by the link using one or more resources of the client computing device or the server device based on one or more factors; when the determination indicates that one or more resources of the client computing device are to be used, accessing the storage location indicated by the link using one or more resources of the client computing device; and when the determination indicates that one or more resources of the server device are to be used, sending at least part of the link to the server device.

The method may further comprise: receiving, from the server device, information for presentation to a user in response to the sending of at least part of the link to the server device.

Another aspect of the present invention may provide a method of operating a server device in a remote access system, the server device being connected to a client computing device, the method comprising: executing a first computer program using one or more resources of the server device, the execution of the first computer program resulting in the presentation of a link; receiving an instruction to access a storage location indicated by the link; determining whether to access the storage location indicated by the link using one or more resources of the client computing device or the server device based on one or more factors; when the determination indicates that one or more resources of the server device are to be used, accessing the storage location indicated by the link using one or more resources of the server device; and when the determination indicates that one or more resources of the client computing device are to be used, sending at least part of the link to the client computing device.

Another aspect of the present invention provides a client computing device for use in a remote access system, the client computing device being connectable to a server device, wherein the client computing device is configured to: execute a first computer program using one or more resources of the client computing device, the execution of the first computer program resulting in the presentation of a link; receive an instruction to access a storage location indicated by the link; determine whether to access the storage location indicated by the link using one or more resources of the client computing device or the server device based on one or more factors; when the determination indicates that one or more resources of the client computing device are to be used, access the storage location indicated by the link using one or more resources of the client computing device; and when the determination indicates that one or more resources of the server device are to be used, send at least part of the link to the server device.

Another aspect of the present invention provides a server device for use in a remote access system, the client computing device being connectable to a client computing device, wherein the server device is configured to: execute a first computer program using one or more resources of the server device, the execution of the first computer program resulting in the presentation of a link; receive an instruction to access a storage location indicated by the link; determine whether to access the storage location indicated by the link using one or more resources of the client computing device or the server device based on one or more factors; when the determination indicates that one or more resources of the server device are to be used, access the storage location indicated by the link using one or more resources of the server device; and when the determination indicates that one or more resources of the client computing device are to be used, send at least part of the link to the client computing device.

According to another aspect of the present invention we provide a method of managing the execution of a computer program in a remote access system, comprising: connecting a client computing device to a server device; receiving a request from the client computing device to operate a computer program; determining a device on which to execute the computer program; and executing the computer program on the server device or the client computing device according to the determination, the computer program being executable on both the client computing device and the server device respectively.

The method may further comprise: displaying an icon on client computing device, the icon being user selectable to initiate the sending of the request.

The determination may be made by the client computing device.

The request may be received by the client computing device.

The determination may be made by the server device.

The server device may be remote from the client computing device.

Another aspect of the present invention provides a remote access system comprising: a client computing device; a server device communicatively coupled to the client computing device, wherein system is configured to: receive a request from the client computing device to operate a computer program; determine a device on which to execute the computer program; and execute the computer program on the server device or the client computing device according to the determination, the computer program being executable on both the client computing device and the server device respectively.

The client computing device may further comprise a display configured to displaying an icon on client computing device, the icon being user selectable to initiate the sending of the request.

The client computing device may be configured to make the determination.

The client computing device may be configured to receive the request.

The server device may be configured to make the determination.

The server device may be remote from the client computing device.

Another aspect of the present invention provides a method of operating a client computing device in a remote access system, the client computing device being connected to a server device, the method comprising: transmitting a request from the client computing device to operate a computer program; determining, or receiving a determination of, a device on which to execute the computer program; and executing the computer program on the client computing device or receiving returned information from the execution of the computer program on the server device according to the determination, the computer program being executable on both the client computing device and the server device respectively.

Another aspect of the present invention provides a method of operating a server device in a remote access system, the server device being connected to a client computing device, the method comprising: receiving a request from the client computing device to operate a computer program; determining, or receiving a determination of, a device on which to execute the computer program; and executing the computer program on the server device or instructing the execution of the computer program on the client computing device according to the determination, the computer program being executable on both the client computing device and the server device respectively.

Another aspect of the present invention provides a client computing device for use in a remote access system, the client computing device being connectable to a server device, wherein the client computing device is configured to: transmit a request from the client computing device to operate a computer program; determine, or receive a determination of, a device on which to execute the computer program; and execute the computer program on the client computing device or receive returned information from the execution of the computer program on the server device according to the determination, the computer program being executable on both the client computing device and the server device respectively.

Another aspect of the present invention provides a server device for use in a remote access system, the client computing device being connectable to a client computing device, wherein the server device is configured to: receive a request from the client computing device to operate a computer program; determine, or receive a determination of, a device on which to execute the computer program; and execute the computer program on the server device or instruct the execution of the computer program on the client computing device according to the determination, the computer program being executable on both the client computing device and the server device respectively.

Another aspect of the present invention provides a method of managing access to a computer program in a remote access system, the method comprising: storing, at a server device, a list of one or more permitted computer programs; connecting a client computing device to the server device such that one or more resources of the server device are useable by the client computing device in the execution of one or more computer programs; receiving, at the server device, a request for the installation of the computer program; determining if the computer program is listed in the list of one or more permitted computer programs; and when the computer program is in the list of permitted computer programs, sending an indication from the server device to the client computing device that the computer program can be obtained from an application deployment server, and the client computing application obtaining the computer program from the application deployment server.

Another aspect of the present invention provides a method of providing support services to a client computing device, the method comprising: establishing a remote access connection between a client computing device and a server device such that one or more resources of the server device are useable by the client computing device in the execution of one or more computer programs, the remote access connection including one or more virtual channels; sending an assistance request to a support services device connected to the server device; and providing remote access to the client computing device by a further client computing device connected to the server device in response to receipt of the assistance request by the support services device, wherein remote access is provided via one or more of the one or more virtual channels.

Providing remote access may include providing information from the execution of one or more computer programs by the client computing device and/or the server device.

At least one of the one or more computer programs may be a computer program executed by the server device for the client computing device.

Information from the at least one computer program may be delivered directly from the server device to the further client computing device.

Information from the at least one computer program may be delivered to the further client computing device via the client computing device.

The support services device may be the further client device.

Another aspect of the present invention provides a method of obtaining support services from a client computing device, the method comprising: establishing a remote access connection between the client computing device and the server device such that one or more resources of the server device are useable by the client computing device in the execution of one or more computer programs, the remote access connection including one or more virtual channels; sending an assistance request to a support services device connected to the server device; and providing remote access to the client computing device by a further client computing device connected to the server device, wherein remote access is provided via one or more of the one or more virtual channels.

Another aspect of the present invention provides a method of providing support services to a client computing device, the method comprising: establishing a remote access connection between the client computing device and the server device such that one or more resources of the server device are useable by the client computing device in the execution of one or more computer programs, the remote access connection including one or more virtual channels; receiving an assistance request for a support services device connected to the server device; and providing remote access to the client computing device by a further client computing device connected to the server device, wherein remote access is provided via one or more of the one or more virtual channels.

Another aspect of the present invention provides a client computing device for use in a remote access system, the client computing device being connectable to a server device, wherein the client computing device is configured to: establish a remote access connection between the client computing device and the server device such that one or more resources of the server device are useable by the client computing device in the execution of one or more computer programs, the remote access connection including one or more virtual channels; send an assistance request to a support services device connected to the server device; and provide remote access to the client computing device by a further client computing device connected to the server device, wherein remote access is provided via one or more of the one or more virtual channels.

Another aspect of the present invention provides a server device for use in a remote access system, the client computing device being connectable to a client computing device, wherein the server device is configured to: establish a remote access connection between the client computing device and the server device such that one or more resources of the server device are useable by the client computing device in the execution of one or more computer programs, the remote access connection including one or more virtual channels; receive an assistance request for a support services device connected to the server device; and provide remote access to the client computing device by a further client computing device connected to the server device, wherein remote access is provided via one or more of the one or more virtual channels.

Another aspect of the present invention provides a method of monitoring user activity in a remote access system, the method comprising: receiving first information regarding the activities of a user in relation to a first computer program executed by a client computing device; receiving second information regarding the activities of a user in relation to a second computer program executed by a server device connected to the client computing device and operating at least in part under instruction from the client computing device; and collating the first and second information to provide combined user activity information relating to the activities of the user.

At least one of the first and second information may include a time period in which the first and second computer program respectively is receiving a user input.

At least one of the first and second information may include the name of the first and second computer program respectively.

The combined user activity information may be stored on the server device.

Another aspect of the present invention provides a server device for use in a remote access system, the client computing device being connectable to a client computing device, wherein the server device is configured to: receive first information regarding the activities of a user in relation to a first computer program executed by a client computing device; receive second information regarding the activities of a user in relation to a second computer program executed by the server device connected to the client computing device and operating at least in part under instruction from the client computing device; and collate the first and second information to provide combined user activity information relating to the activities of the user.

Another aspect of the present invention provides a method of distributing group policy objects to one or more client computing devices, the method comprising: establishing a remote access connection between one or more client computing devices and a server device, such that the or each client computing device is configured to instruct the execution of one or more respective computer programs using resources of the server device; and transmitting, from the server device to the or each client computing device, a group policy object.

BRIEF DESCRIPTION OF THE DRAWINGS

Embodiments of the invention are described, by way of example only, with reference to the accompanying drawings, of which.

DETAILED DESCRIPTION

Figure 1:
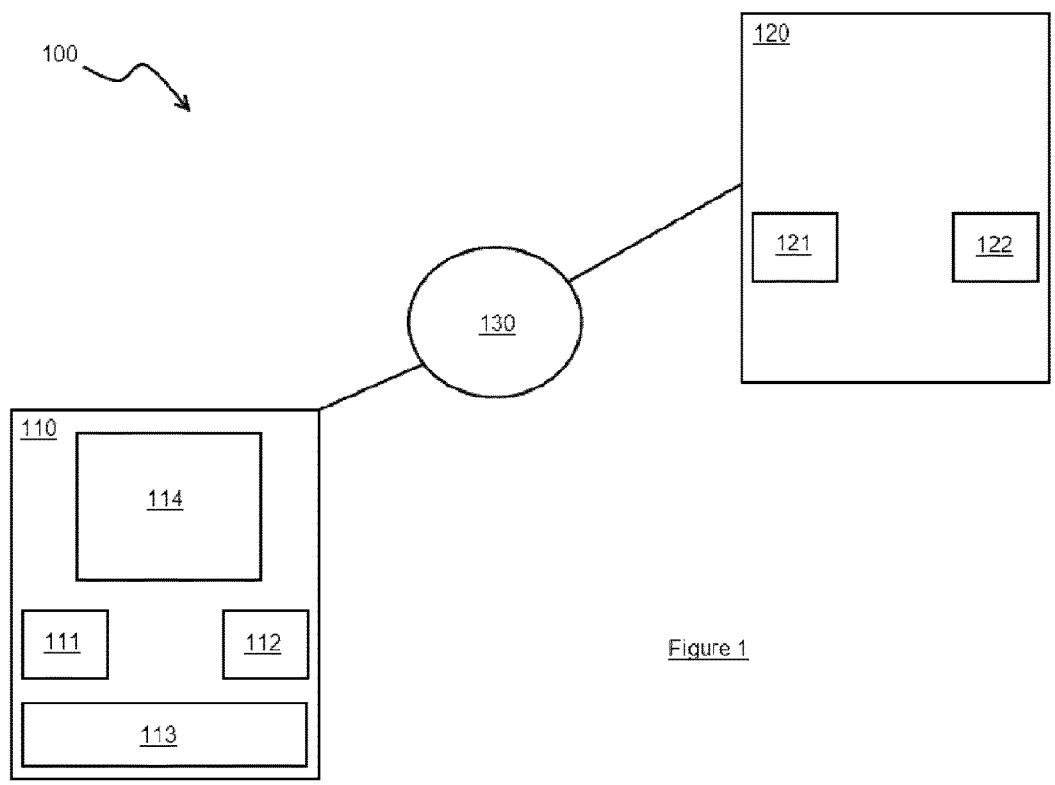
FIG. 1 is a schematic diagram of a system according to an embodiment of the invention.
Figure 2:
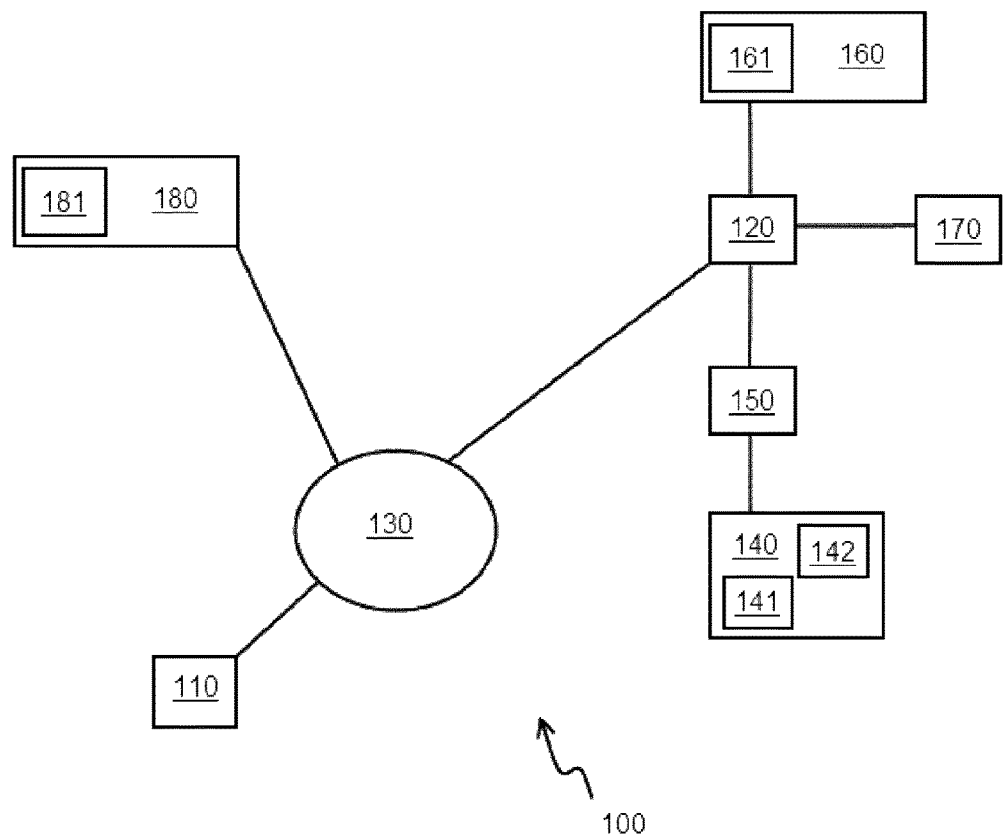
FIG. 2 is a schematic diagram of a system according to an embodiment of the invention.
Figure 3:
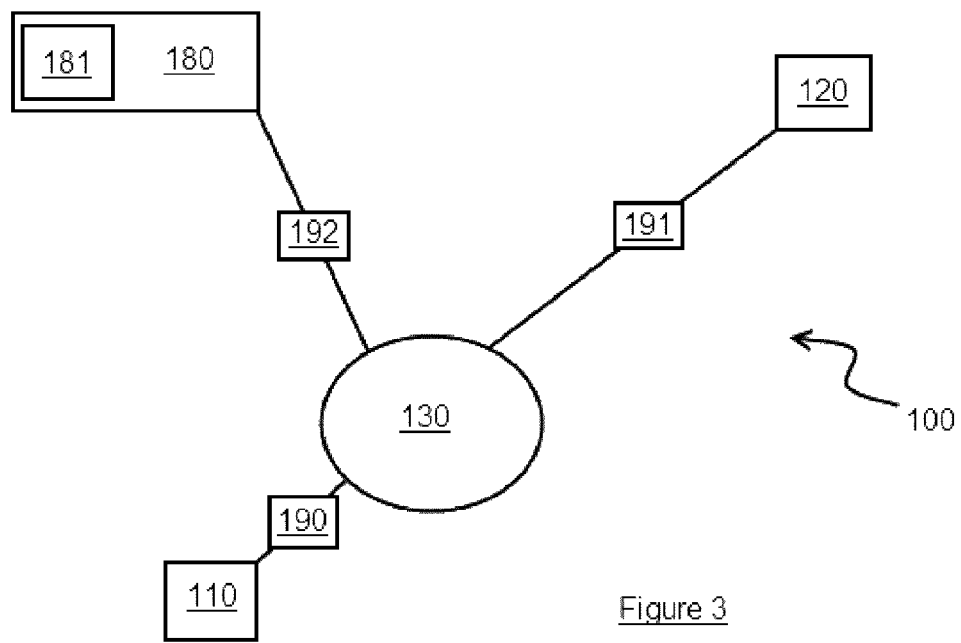
FIG. 3 is a schematic diagram of a system according to an embodiment of the invention.

With reference to FIGS. 1 to 3, a remote access system 100 is shown.

The remote access system 100 comprises a server device 120 which is communicatively coupled to a client computing device 110. The communicative coupling may be through the Internet 130 (depicted by way of example only) and/or may include: a wired and/or wireless network connection (including, for example, a local area network connection, a wide area network connection, a cellular telephone connection, an Ethernet connection, and the like). The communicative coupling is such that the server device 120 and client computing device 110 may be decoupled from each other and re-coupled to each other.

The server device 120 has computing resources at its disposal for use in the operation of one or more computer programs. The computing resources of the server device 120 may include one or more storage media 121 and a processing arrangement 122. The processing arrangement 122 may include a one or more central processing units, along with, for example, associated memory and data buses. Other resources at the disposal of the sever device 120 may include, for example, one or more network connections—which may include a connection to the Internet.

The client computing device 110 also has computing resources at its disposal for using the operation of one or more computer programs. The computing resources of the client computing device 110 may include one or more storage media 111 and a processing arrangement 112. The processing arrangement 112 may include a one or more central processing units, along with, for example, associated memory and data buses. Other resources at the disposal of the client computing device 110 may include, for example, one or more network connections—which may include a connection to the Internet.

The or each storage media 111,121 of the server device 120 and the client computing device 110 may be configured to store data which is used by the respective processing arrangements 112,121 in the operation of one or more computer programs—which may include instructions as well as data to be processed in accordance with the instructions.

In embodiments, the client computing device 110 also includes an input arrangement 113 which is configured to receive input from a user and may include, for example, a keyboard, a mouse, a touch sensitive screen, voice or gesture recognition arrangements and the like. In embodiments, the client computing device 110 includes an output arrangement 114 which is configured to output information to a user and may include, for example, a display screen, an audio speaker, and the like.

As will be appreciated, the system 100 may include a plurality of such client computing devices 110. In general, one client computing device 110 is depicted and described for the sake of simplicity only.

A connection between the server device 120 and the client computing device 110 may be established as a result of a request issued by the client computing device 110. As such, the client computing device 110 is configured to issue a connection request to the server device 120 over the network connection (such as the Internet 130). In embodiments, the request is generated by the client computing device 110 in response to input by a user. In embodiments, the request is generated automatically (or substantially automatically) as a result of the client computing device 110 being connected to a network connection which communicatively couples the client computing device 110 to the server device 120 (or which the client computing device 110 believes may potentially communicatively couple the two devices 110,120).

On receiving the request for connection, the server device 120 is configured to establish a connection with the client computing device 110 such that the client computing device 110 may utilise at least part of the computing resources of the server device 120 to operate one or more computer programs. The one or more computer programs may be operated, at least in part, under the control of the client computing device 110—which may instruct the operation of certain aspects of the or each computer program.

The establishing of a connection between the client computing device 110 and the server device 120 will, as will be appreciated, establish one or more virtual channels across the communicative coupling between the two devices 110, 120. These one or more virtual channels may be established based on a remote desktop system such as the Remote Desktop Protocol, by Microsoft® Corporation, or Independent Computing Architecture, by Citrix Systems Inc, of Fort Lauderdale, Fla., USA. The use of other systems and protocols to establish the one or more virtual channels is also envisaged. The one or more virtual channels allow for one or more virtualised computer programs ('virtualised applications') to be presented to the user ('pushed' to the user) and presented to the user on the output arrangement 114 of the client computing device 110—even if the computing resources of the server device 120 are being used for the execution of the one or more computer programs. The one or more virtual channels may allow for the streaming of data between the two devices 110,120. In other words, according to embodiments, a virtualised computer program may be deployed over a virtual channel between the two devices 110,120 and this channel may be a channel associated with a remote desktop system.

In embodiments, information received from the server device 120 which is to be presented to the user through the output arrangement 114 of the client computing device 110 is presented in a browser (such as an Internet browser) on the client computing device 110. In embodiments, information which is input by the user of the client computing device 110 through the input arrangement 113 is associated with one or more items of information presented in the browser on the client computing device 110 and sent to the server device 120. In embodiments, this browser-based remote desktop system is provided using HTML5.

As discussed herein a computer program may be executed using the resources of the client computing device 110 or the server device 120. It will be appreciated that references to the resources of the server device 120 being used to execute a particular computer program is a reference to the execution of primary elements of the computer program. One or more resources of the client computing device 110 may, of course, still be used in relation to presenting the output of the program to the user, receiving user inputs and transmitting the inputs and outputs to and from the server device 120—the resources of the client computing device 110 are not, however, used to perform the main computation in accordance with the computer program in such examples.

In embodiments, the client computing device 110 must be authenticated by the server device 120 to establish a connection therebetween. In a simple example, this authentication merely requires the transmission of a username and password (entered by the user to the client computing device 110 using the input arrangement 113) to the server device 120—which then checks this against a stored list of one or more usernames and passwords of legitimate users.

In embodiments, the authentication may include multiple levels of authentication. For example, the client computing device 110 may authenticate itself with the server device 120 and the user may then authenticate themselves with the server device 120.

Authentication of the client computing device 110 with the server device 120 may include the authentication with the server device 120 of one or more unique or substantially unique identifiers associated with the client computing device 110. The server device 120 may include a list of the one or more unique or substantially unique identifiers for the client computing device 110 (or a plurality of such devices 110).

On requesting a connection, the client computing device 110 may send one or more of the one or more unique or substantially unique identifiers (or one or more parts thereof) to the server device 120. The server device 120 receives the one or more of the one or more unique or substantially unique identifiers (or one or more parts thereof) and checks the or each identifier (or one or more parts thereof) against the stored list to confirm whether or not the request has come from a legitimate client computing device 110 (as will be understood, the request may have come from a client computing device which is not permitted to connect to the server device 120 and such client computing devices should be refused connection).

If the one or more of the one or more unique or substantially unique identifiers (or one or more parts thereof) is present in the list stored on the server device 120, then the client computing device 110 is permitted to establish a connection with server device 120. Accordingly, such a connection is established. In embodiments, no further authentication is required but in other embodiments one or more further stages (or levels) of authentication are required. The or each further stage of authentication may include the transmission from the client computing device 110 to the server device 120 one or more of: a username, a password, and biometric data associated with the user. Again, a corresponding list of such information is stored on the server device 120 and the information received at the server device 120 is cross-checked with the information which is stored to confirm (or not) the identity of the user and, hence, whether or not a connection can be established. Typically, if the transmitted information matches the stored information then a connection is established and connection is refused if the information does not match.

The one or more unique identifiers or substantially unique identifiers associated with the client computing device 110 may include, for example, a Media Access Control (MAC) address, and Internet Protocol address, and/or an identifier associated with one or more components (hardware and/or software) of the client computing device 110 (such as an identifier associated with a motherboard, a hard disk, a memory module, operating system, a Secure Sockets Layer certificate, a Trusted Platform Module cryptographic key etc). Clearly, an Internet Protocol address may not be a suitable identifier in some circumstances because a client computing device 110 may be allocated one or more Internet Protocol addresses dynamically and may, therefore, have one or more Internet Protocol addresses which change from time-to-time. However, other client computing devices 110 may be allocated a static Internet Protocol address. In addition, an Internet Protocol address may be used for one or more further purposes—for example, to establish the location (or possible location) of the client computing device 110. If the client computing device 110 has one or more predetermined Internet Protocol addresses associated therewith, then the server device 120 may provide the client computing device 110 with access to one or more further resources of the server device (e.g. access to a particular storage medium 121)—as the server device 120 may view the or each predetermined Internet Protocol address as indicating that the client computing device 110 is communicatively coupled to the server device 120 via, at least in part, a trusted network (which may be more secure than other networks). Equally, in embodiments, if the client computing device 110 does not have one or more predetermined Internet Protocol addresses then the server device 120 may restrict access by the client computing device 110 to one or more resources of the server device 120. The server device 120 may, therefore, store a list of predetermined Internet Protocol addresses which may be associated with one or more client computing devices 110 (this list may be separate or combined with the list of one or more unique or substantially unique identifiers).

In embodiments, the one or more unique identifiers or substantially unique identifiers associated with the client computing device 110 may include, for example, a geographical location established by, for example, a satellite or ground-based positioning system—such as the Global Positioning System, GLOSNASS, Galileo, Compass, LORAN, and the like. If the client computing device 110 has a predetermined geographical location or the geographical location is within a predetermined geographical region, then the server device 120 may provide the client computing device 110 with access to one or more resources or further resources of the server device (e.g. access to a particular storage medium 121). Equally, in embodiments, if the client computing device 110 does not have a predetermined geographical location or the geographical location is within a predetermined geographical region then the server device 120 may restrict access by the client computing device 110 to one or more resources of the server device 120. The server device 120 may, therefore, store a list of predetermined geographical locations and/or geographical regions which may be associated with one or more client computing devices 110 (this list may be separate or combined with the list of one or more unique or substantially unique identifiers) . In embodiments, the geographical location is not the one or more unique identifiers or substantially unique identifiers associated with the client computing device 110 but may be an additional identifier associated with the client computing device 110 which is used in combination with the one or more unique identifiers or substantially unique identifiers associated with the client computing device 110.

Embodiments of the present invention include a computer program which is configured to collect the or each unique or substantially unique identifier (or one or more parts thereof) from the client computing device 110 and to transmit the information as part of a request for a connection to be established with the server device 120. The information may be encrypted before it is transmitted to the server device 120.

The list of one or more unique or substantially unique identifiers (or one or more parts thereof) for the client computing device 110 which is stored on the server device 120 may be collated in a number of different ways. For example, a webpage may be provided through the Internet which a user can access (using their client computing device 110). The webpage may prompt the user to download a computer program which collects the information from the client computing device 110 and sends that information to a server (which may be the server device 120)—the user may, of course, be prompted through the webpage to execute the computer program to collect and send the information. The webpage may also prompt the user to enter other information to verify that the user (and their client computing device 110) should be allowed to establish a connection with the server device 120. For example, the other information may include one or more of: a user name, a user identifier, a date of birth, an employee identifier for the user, a payroll number for the user, an email address for the user, a manager name for the user, a home address for the user, a work address for the user, a telephone number for the user, a social security (i.e. National Insurance) number for the user, a serial number of the client computing device 110, and the like.

The information entered by the user (if applicable) and the one or more unique or substantially unique identifiers (or one or more parts thereof) for the client computing device 110 may be cross-checked against one or more records associated with the user and/or client computing device 120—the one or more records may be stored on the server providing the webpage or may be stored on the server device 120, for example, and the one or more records includes one or more unique or substantially unique identifiers (or one or more parts thereof) for one or more client computing devices 110 along with corresponding information to verify the identity of the user. The one or more records may have been established by an operator or provider of the system 100—for example, an organisation which employs the user or which manages the system 100 on behalf of an organisation which employs the user.

If a match is found between the information received from the client computing device 110 and the information stored in one or more of the one or more records, then the client computing device 110 and user may be considered to be allowed to connect to the server device 120. In embodiments, the or each record also includes information regarding whether or not the client computing device 110 and/or user are, in fact, allowed to establish a connection—in other words, a match may indicate that the client computer device 110 is a legitimate device and/or that the user is a legitimate user, but the establishing of a connection may be prohibited for other reasons (e.g. the user has restricted connection privileges).

In embodiments, the above discussed arrangements may be used by a user to register a new (previously unregistered) client computing device 110 with the server device 120. Thus, the server presenting the webpage (and/or the server device 120) may authenticate the user based on information provided about the user, the server presenting the webpage (and/or the server device 120) may then record one or more unique identifiers or substantially unique identifiers (or parts thereof) in associate with an identifier for the user. The user and the client computing device 110 may then be allowed to connect to the server device 120. In embodiments, if a user is identified as legitimate but is attempting a connection through a client computing device which was previously unknown to the server presenting the webpage (and/or the server device 120), then connection may be permitted but the connection may be limited such that the client computing device 110 is prohibited from accessing certain resources of the server device 120 (e.g. one or more storage media 121 or one or more computer programs). In addition, a message may be sent to one or more other users (e.g. an administrator) notifying them of the connection by a known user through an unknown client computing device 110. Furthermore, additional activity monitoring may be implemented in relation to the operations of the client computing device 110. In embodiments, the connection by a known user through an unknown client computing device 110 may be restricted to a predetermined time period—after which the connection is terminated. In embodiments, the connection by a known user through a client computing device 110 which is known but which has not been connected for a predetermined period of time may be restricted or prevented. In embodiments, a connection may be terminated if it remains inactive for a predetermined period of time.

If the user and/or the client computing device 110 are to be allowed to establish a connection with the server device 120, then the one or more unique or substantially unique identifiers (or one or more parts thereof) for the client computing device 110 may be added to the list stored by the server device 120. Further information may be added to the list (or a separate list) regarding the identity of the user—e.g. a username, password, and/or biometric data. This further information being needed for the additional level of authentication discussed above.

One or more connection parameters may be added to the list stored in the server device 120 and associated with the or each unique or substantially unique identifier (or one or more parts thereof) for the client computing device 110 and/or the information regarding the identity of the user.

The one or more connection parameters may include information regarding the resources of the server device 120 which the client computing device 110 is permitted to access. The one or more connection parameters may include information regarding the one or more resources of the client computing device 110 which can, or cannot, be connected to the server device 120.

Thus, for example, a particular user and/or client computing device 110 may be restricted from accessing a particular storage medium 121 of the server device 120, or from utilising a particular processing arrangement 122 of the server device 120. Equally, one or more storage media 111 of the client computing device 110 may be prevented from connecting to the server device 120 such that the server device 120 cannot access the one or more prohibited storage media 111—this may be useful if the one or more prohibited storage media 111 represents a security risk (e.g. due to limited checks for malicious computer programs stored thereon, or because of sensitive data stored thereon).

In embodiments, after a connection has been established between the client computing device 110 and the server device 120, the server device 120 may perform an analysis of one or more of the computing resources of the client computing device 110. The analysis may include a search for one or more security issues—including, for example, a malicious computer program, out of date software for identifying a malicious computer program, and the like. As a result of the analysis, the server device 120 may restrict the connection of one or more computing resources of the client computing device 110 to the server device 120. Thus, if a malicious computer program is discovered or there is an indicator of a high risk of a malicious computer program being present on a particular storage medium 111 of the client computing device 110, then the server device 120 may restrict access to that particular storage medium 111 by the server device 120. The restriction may include preventing any access, or allowing access only if data from the storage medium is scrutinised by an additional security computer program (which is configured to identify malicious computer programs). As will be appreciated, the server device 120 may need to access data stored on one or more of the or each data storage media 111 of the client computing device 110 in order to perform a particular task—e.g. to process data or to open a particular computer file.

In embodiments, the server device 120, after a connection with the client computing device 110 has been established, is configured to check the update status of an operating system of the client computing device 110. If the operating system of the client computing device 110 is missing one or more updates, then the server device 120 may terminate the connection between the devices 110,120. The or each update may include one or more security patches or the like.

In embodiments, if a security issue (of any type) is identified in the analysis, then the connection between the client computing device 110 and the server device 120 may be terminated.

In embodiments, the unique or substantially unique identifier (or a part thereof) of a client computing device 110 may be determined when a connection is attempted to a server device 120. In such an embodiment there may be a plurality of possible server devices 120 to which the client computing device 110 may be connected, and the unique or substantially unique identifier (or a part thereof) is compared against a list stored in server device 120 with which the connection is attempted. The list may indicate that the client computing device 110 is to connect to a different server device 120. Accordingly, the server device 120 with which the connection was attempted may redirect the client computing device 110 to establish a connection with another server device 120. As will be appreciated a plurality of client computing devices 110 may be associated with any one or more of a plurality of server devices 120. In embodiments, one of the server devices 120 acts as a gateway which redirects connection requests to the appropriate server device 120.

In embodiments, the output of the operation of the one or more computer programs executed using the resources of the server device 120 is returned to the client computing device 110 and may be presented to a user through the output arrangement 114. The or each computer program may be provided with instructions from the client computing device 110 to control the operation thereof.

For example, in embodiments, the client computing device 110 may instruct the server device 120 to provide a desktop application which presents a desktop including one or more icons to the user of the client computing device 110 through the output arrangement 114. The or each icon may represent a computer program and/or a computer file; selection of an icon by a user (using the input arrangement 113 of the client computing device 110) may, for example, cause the execution of a computer program represented by the icon or the opening of a file represented by the icon.

In embodiments, a desktop which is presented to user as a result of the execution of a desktop application on the server device 120 may be integrated with a desktop which is presented simultaneously to a user as a result of the execution of a desktop application on the client computing device 110—both desktops being presented through the output arrangement 114. The integration may be such that, for example, a single desktop is presented with a mixture of icons which are each presented by the desktop application of the server device 120 and the client computing device 110.

In embodiments, the server device 120 sends to the client computing device 110 a list of computer programs and/or computer files which are then presented within the desktop of the client computing device 110 (i.e. the desktop is provided by a computer program executed using the resources of the client computing device 110). In embodiments, the client computing device 110 sends to the server device 120 a list of computer programs and/or computer files which are then presented within the desktop of the server device 120 (i.e. the desktop is provided by a computer program executed using the resources of the server device 120). In such embodiments, only one desktop may be presented to the user with a mixture of, for example, icons.

In other words, according to embodiments, a user may be presented with a unified list of computer programs and files which are accessible by the client computing device 110 either directly from the client computing device 110 or from the server device 120. The list is presented through the output arrangement 114.

A user may select a computer program for execution (using the input arrangement 113). In embodiments, that computer program is, as a result of the selection, executed using the resources of the server device 120 or the client computing device 110 as a result of the operation of one or more rules.

The or each rule may take into account the availability of the computer program on the or each storage media of the client computing device 110 and the server device 120, the availability of resources for the execution of the computer program on the client computing device 110 and the server device 120 (including one or more of the available processing power of one or more graphics processing units and/or one or more central processing units, available memory, a network connection speed, and the like) one or more security requirements, the location of the client computing device 110, one or more licence considerations, the location of a computer file required by the computer program, and/or the available resources of the communicative coupling between the client computing device 110 and the server device 120, for example.

In embodiments, if the client computing device 110 does not have a particular computer program installed which is required for execution using the resources of the client computing device 110, then the client computing device 110 is configured to transmit a notification to the server device 120.

The server device 120 is configured to receive the notification that the client computing device 110 does not have a computer program installed which is required.

The server device 120 has stored thereon a database including the details of one or more computer programs which are permitted to be executed using the resources of the client computing device 110. The database may also include information such as whether or not a licence is available for the use of one or more computer programs on the client computing device 110. The database may also include information regarding the availability of one or more computer programs (or one or more respective installation files for the one or more computer programs) from an application deployment server 180. The database may also include the location of a copy of the computer program or an installation file for the computer program within the server device 120.

In response to the notification from the client computing device 110, the server device 120 may transmit one or more of: the computer program, an installation file for the computer program, and a link to an installation file for the computer program, an indication that the client computing device 110 can contact an application deployment server 180 in order to obtain the computer program or an installation file for the computer program. The aforementioned responses may be transmitted if there is an available licence for use of the computer program and the computer program is permitted for execution on the client computing device 110. If there is no available licence or execution of the computer program using the resources of the client computing device 110 is not permitted, then a failure message may be returned to the client computing device 110 and a failure indication presented to the user through the output arrangement 114 indicating that the computer program cannot be executed.

The application deployment server 180 is communicatively coupled to the client computing device 110. The communicative coupling may be via a network connection, such as a connection to the Internet 130 (as depicted by way of example only), and may include a local or wide area network (including a wired and/or a wireless network (which may include a cellular telephone network), for example). The application deployment server 180 includes one or more data storage media 181.

One or more computer programs and/or installation files for one or more computer programs are stored on the one or more storage media 181 of the application deployment server 180.

If the server device 120 responds to the notification from the client computing device 110 with an indication that the client computing device 110 can contact an application deployment server 180 in order to obtain the computer program or an installation file for the computer program, then the client computing device 110 may issue a communication to the application deployment server 180. The communication may include an indication of the computer program which is required. The communication may include an identifier for the client computing device 110 and/or the user of the client computing device 110.

In response to the communication, the application deployment server 180 may confirm whether or not the computer program (or an installation file for the computer program) mentioned in the communication is available on the one or more storage media 181 of the application deployment server 180.

If the computer program is available or an installation file for the computer program is available, then the application deployment server 180 is configured to send the computer program or the installation file for the computer program to the client computing device 110 over the communicative coupling therebetween. In response to receipt of the computer program or installation file, the client computing device 110 may install the computer program. If appropriate, then the client computing device 110 may then execute the computer program using the resources of the client computing device 110.

If the computer program is not available and/or an installation file for the computer program is not available to the application deployment server 180, then the application deployment server 180 may send a failure message to the client computing device 110. In response to the failure message, the client computing device 110 may present an indication to the user through the output arrangement 114 that the computer program cannot be executed or cannot be executed using the resources of the client computing device 110.

In embodiments, instead of sending a computer program or an installation file, the application deployment server 180 is configured to provide the client computing device 110 with a virtualised computer program which may be hosted by the application deployment server 180 (i.e. executed using the resources thereof). Similarly, if this is not possible, then a failure message may be sent to the client computing device 110 which may result in the user being presented with a corresponding failure indication through the output arrangement 114.

In embodiments, the application deployment server 180 may be communicatively coupled to the server device 120. In such embodiments, the application deployment server 180 may request confirmation from the server device 120 that a computer program or an installation file for a computer program can be sent to the client computing device 110. The application deployment server 180 may await confirmation before sending the computer program or the installation file for the computer program to the client computing device 110. If confirmation is not received, then the application deployment server 180 may send a failure message to the client computing device 110—which may be handled in the same manner as the failure message discussed above. The same process may also be implemented for the provision of a virtualised computer program.

As will be understood, in such embodiments, the server device 120 is configured to receive a request for confirmation that a computer program or installation file for a computer program (or virtualised computer program) may be sent to a client computing device 110. The server device 120 may store a record of a response to one or more notifications from the client computing device 110 which indicate the client computing device 110 can contact the application deployment server 180 in order to obtain the computer program or an installation file for the computer program (or virtualised computer program). The server device 120 may, therefore, check that the client computing device 110 was sent such a response in relation to the computer program or installation file (or virtualised computer program) and issue the confirmation if such a response was sent. If such a response was not sent, then the server device 120 may issue a failure message to the application deployment server 180 which may be passed onto the client computing device 110 by the application deployment server 180 and handled in a manner corresponding with the handling of failure messages discussed above. As will be appreciated, the confirmation request from the application deployment server 180 to the server device 120 may include an identifier for the client computing device 110 and/or the user, along with an identifier for the computer program or installation file.

In embodiments, the server device 120 maintains a list of the current users of one or more computer programs. The number of current users may be checked against a licence agreement associated with one or more of the computer programs to confirm that all of the users are licensed users. A server device may be configured to prevent additional users from executing a computer program if there are no available licences. Accordingly, the list of current users of one or more computer programs may include a list of the client computing devices 110 on which the or each computer program is currently installed, a list of the or each client computing device 110 which is currently executing the computer program, and a list of the or each client computing device 110 which may potentially be using the computer program (which may be use as a virtualised computer program). Therefore, when a computer program is in use on a client computing device 110, then the client computing device 110 may inform the server device 120 so that the list can be maintained. A client computing device 110 may potentially be using a computer program if the computer program has been installed on the client computing device 110 but the client computing device 110 is currently not connected to the server device 120 (and so may or may not be executing the computer program). As will be appreciated, the list stored on the server device 120 is updated as client computing devices 110 cease execution of the computer program, or uninstall the computer program (or cease use of a virtualised computer program)—indicating that the licence of that user is not needed and can be reallocated to another user or client computing device 110.

In embodiments, on the establishing of a connection between the client computing device 110 and the server device 120, the client computing device 110 may send a list of the installed computer programs on the client computing device 110 to the server device 120. This list may comprise an identifier for the or each computer program which is installed on the client computing device 110. In response to receipt of the list, the server device 120 may check the content of the list against the database which includes the details of one or more computer programs which are permitted to be executed using the resources of the client computing device 110. The database may also include, in this embodiment, an indication of which one or more computer programs should be installed on the client computing device 110.

If one or more computer programs should be installed on the client computing device 110 but are not—based on the comparison of the list and the information in the database—then the client computing device 110 may be sent a response by the server device 120 which may be of the same form and function as the response to the notification discussed above, such that the one or more computer programs which should be installed on the client computing device 110 are installed thereon.

The various communications, notifications, responses, requests and the like between the client computing device 110, the server device 120, and the application deployment server 180 may be substantially invisible to a user (unless otherwise indicated).

Part of the installation of a computer program on the client computing device 110 may include the addition of the computer program to a list of available computer programs on the client computing device 110—a list which may be presented to the user and from which the user may select a computer program for execution. The or each computer program may be represented by an icon. In embodiments, a computer program which is available for installation but not actually installed on the client computing device 110 may be listed in a similar manner—selection of the computer program causing its installation.

In embodiments, a particular computer program may be available for execution using the resources of either the client computing device 110 or the server device 120. In response to a user selection of the computer program (either directly or my the selection of a computer file which requires to the computer program) then a determination may be made as to whether to use the resources of the client computing device 110 or the server device 120 to execute the computer program. The determination may be based on one or more rules—see the rules discussed above. The determination may be made by the client computing device 110 and/or the server device 120. The determination may, however, need information from the other device 110,120 (e.g. regarding the available resources for that device 110,120)—which may be sent over the communicative coupling between the devices 110,120. In embodiments, a device 110, 120, includes a record of one or more resources of the other device 110,120 such that the determination can be made. In embodiments, the information is requested from the other device 110,120 on an ad-hoc basis when the determination needs to be made.

If one or more computer programs which are or may be required for execution are not available for execution using the resources of the client computing device 110, for whatever reason, but the one or more computer programs are available for execution using the resources of the server device 120, then the or each computer program may be added to the list of available computer programs discussed above.

In embodiments, substantially all of the computer programs which are executable using the resources of either the server device 120 or the client computing device 110 are presented in the aforementioned list of available computer programs.

In embodiments, a one or more computer files on the server device 120 are synchronised with one or more corresponding computer files on the client computing device 110 such that the content of the one or more computer files corresponds with each other—i.e. such that the one or more computer files are substantially mirrored between the server device 120 and the client computing device 110. The synchronisation may be managed by a synchronisation computer program operating on the client computing device 110 and a synchronisation computer program operating on the server device 120—the two computer programs being operable to communicate with each other.

The or each computer file may be stored on both one or more storage media 111 of the client computing device 110 and one or more storage media of the server device 120.

The one or more computer files stored on the client computing device 120 (which are synchronised with one or more computer files stored on the server device 110) may be presented to the user as corresponding one or more computer files stored in a virtual storage medium. The user may interact with the one or more files generally in a manner which is comparable to standard computer file interactions.

In embodiments, one or more of the one or more computer files are not stored on the client computing device 110 unless they are selected by a user—at which point the or each computer file may be transferred to the client computing device 110 from the server device 120. In such embodiments, the or each computer file which is not stored on the client computing device 110 may be represented to the user by a shortcut—which may include an icon. The shortcut may be substantially indistinguishable in form to a representation of an actual file stored on the client computing device 110 (and, in particular, one or more of the computer files of the virtual storage medium)—of course, the file name may be different. Thus, a user may be unaware of whether the or each computer file is stored on both devices 110,120 or only on the server device 120.

Synchronisation of the one or more computer files may be achieved by transferring the entire file or a changed portion thereof ('delta-syncing' or bit-level-syncing) from one device 110,120 to the other 110,120 such that each device 110,120 is updated to store the latest version of the or each computer file.

Synchronisation may occur periodically. Synchronisation may be timed to use the communicative coupling between the two devices 110,120 when the level of usage of the communicative coupling is otherwise low. The use of the communicative coupling for synchronisation may be throttled so that the impact on other uses of the communicative coupling is minimised or negligible. In embodiments the or each computer file which is presented in the virtual storage medium is encrypted. The or each computer file may be configured to age such that, at the end of a predetermined period, the or each computer file will be deleted from the client computing device 110 automatically. The predetermined period may start when a connection between the two devices 110,120 is terminated or established. In embodiment, the or each computer file which is presented in the virtual storage medium is encrypted such that it can only be decrypted if the connection between the two devices 110, 120 has been established (and for the duration of said connection). In embodiments, the client computing device 110 may periodically attempt to connect to the server device 120 and after a predetermined number of unsuccessful connection attempts, then the or each computer file may be deleted or decryption of the or each computer file may be prevented. In embodiments, the client computing device 110 may periodically attempt to confirm an established connection to the server device 120 (i.e. to confirm that the connection remains established).

In embodiments, the client computing device 110 is configured to decrypt the one or more computer files which are presented in the virtual storage medium even if there is no connection established (at present) between the two devices 110,120. In such embodiments, an alternative arrangement may be provided to ensure the security of the or each computer file. For example, a decryption key may be downloadable from the server device 120 for 'offline' use—i.e. when the two devices are disconnected. The decryption key may be downloadable to the one or more storage media 111 of the client computing device 110 or may be downloadable to a removable storage medium (such as a USB storage medium—e.g. a 'USB memory stick'). The decryption key may be associated with the storage medium on which it is located such that it is inoperable if copied to another storage medium—this may be achieved using an identifier for the storage medium as part of the decryption process; equally this may be achieved using a Trusted Platform Module cryptographic key associated with the client computing device 110 and/or storage medium. In embodiments, the decryption using such an 'offline' decryption process may be time limited—such that decryption using the downloaded decryption key is only possible for a limited period of time (which may commence, for example, when the key is downloaded).

As will be appreciated, an offline decryption process can only be used in relation to computer files which are presented in the virtual storage medium and which are stored on the client computing device 110 (files which are presented in the virtual storage medium but which are still stored only on the server device 120 are unavailable when the two devices 110,120 are not connected).

In embodiments, when one or more computer files are transferred from the server device 120 to the client computing device 110, the or each computer file is encrypted such that, once stored on the client computing device 110, the computer file can only be accessed by that client computing device 110. Accordingly, the encryption may be such that the computer file cannot be accessed by another client computing device if copied to that other client computing device from the client computing device 110. The encryption may use a Trusted Platform Module associated with the client computing device 110 to encrypt the or each computer file. Encryption may occur at the server device 120 prior to transmission of the or each computer file to the client computing device 110. As will be appreciated, other hardware specific encryption methods may be implemented to achieve similar functionality.

In embodiments, the server device 120 is configured to initiate a command to the client computing device 110 to delete one or more computer files which have been transferred to the client computing device 110. This may include computer files which are presented in the virtual storage medium and/or one or more other computer files which have been transferred to the client computing device 110. The one or more computer files may include one or more computer programs and/or installation files for a computer program. The one or more computer files may equally have been transferred to the client computing device 110 by another server under the management of the server device 120 (such as an application deployment server).

In embodiments, the server device 120 transmits the or each deletion command to the client computing device 110 over the communicative coupling between the two devices 110,120. In embodiments, the command may be transmitted even if a connection has not been established over the communicative coupling—in other words the authentication steps described herein may not have been performed or may have failed.

In embodiments, the client computing device 110 is configured to attempt to contact a part of the server device 120 periodically when the client computing device 110 believes it may be communicatively connected to the server device 120—e.g. when a network connection of the client computing device 110 is enabled. In response, the server device 120 may transmit one or more deletion commands to the client computing device 110. In embodiments, the server device 120 is configured to buffer deletion commands for the client computing device 110 such that the buffered deletion commands can be sent to the client computing device 110 when the client computing device 110 is next communicatively coupled to the server device 120. As will be appreciated, these operations may be performed by a separate server (distinct from the server device 110) instead.

The or each deletion command may originate from another user—e.g. an administrator—who may be using another client computing device.

If a connection between the two devices 110,120 has been established then the deletion command may be sent through one of the one or more virtual channels of the communicative coupling therebetween.

In embodiments, the synchronisation of one or more computer files is limited to one or more computer files with one or more predetermined file extensions—such that certain types of file are not synchronised. For example, certain type of file may be specific to the device 110,120 and may not serve their intended purpose if stored on another device 110,120. In embodiments, only one or more computer files which are below a predetermined file size are synchronised.

Figure 5:
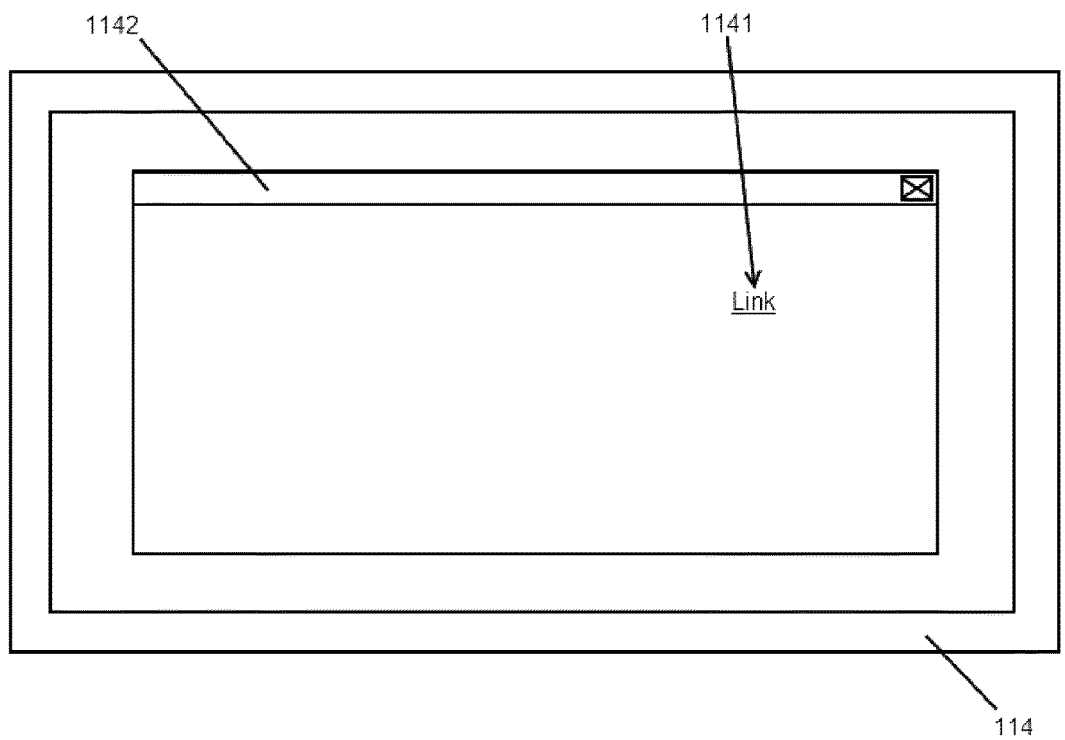
FIG. 5 is an example screen output by an output arrangement of a client device.

In embodiments, a computer program which is executed by (i.e. using the resource of) either the client computing device 110 or the server device 120 presents a link 1141 to a computer file to the user through the output arrangement 114 of the client computing device 110. The link 1141 may be presented in a window 1142 which may be displayed on the output arrangement 114 of the client computing device 110—see FIG. 5. The link 1141 may be, for example, a uniform resource identifier—which may be a uniform resource locator or a uniform resource name. The link 1141 may be the logical address of the computer file. The link 1141 may be the physical address of the computer file (or a part thereof).

The link 1141 may be presented to the user with an identifier which may or may not represent the actual content of the link 1141. Thus, for example, the link 1141 may be a logical address of the computer file but the link 1141 may be presented to the user with an identifier which is an abbreviated form of the actual link 1141 or a name associated with the computer file to which the link 1141 relates.

The link 1141 is user selectable, through use of the input arrangement 113 of the client computing device 110. On selection of the link 1141 a determination is made as to whether the resources of the client computing device 110 or the server device 120 are to be used to access the computer file to which the link 1141 relates. These resources include not only the computing resources of the client computing device 110 and the server device 120 but may also include one or more network resources of the devices 110,120.

The determination may be made by the client computing device 110 or the server device 120. In embodiments, if the computer program which presents the link 1141 to the user is executed by the client computing device 110 then the client computing device 110 performs the determination and if the computer program which presents the link 1141 to the user is executed by the server device 120 then the server device 120 performs the determination. In embodiments, the device 110,120 that performs the determination, requests information from the other device 110,120 as part of the determination.

Which resources are used to access the computer file may depend, in embodiments, on one or more factors. In embodiments, the one or more factors include the location of the computer file (in other words, to where the link 1141 points). If the link 1141 is to a computer file which is stored on a storage medium 121 which is accessible only to the server device 120, then the resources of the server device 120 are used to access the computer file. This may be the case, for example, if the storage media 121 on which the computer file is located is a network drive communicatively coupled to the server device 120 but inaccessible directly from the client computing device 110.

Which resources are used to access the computer file may depend, in embodiments, on the available resources of the server device 120 and the client computing device 110. For example, if the computer file is located on a storage medium of attached to a network which is accessible by both the client computing device 110 and the server device 120, then the determination may be based on the available network connection speed (i.e. data access rate) to that storage medium. The network, in such examples, may include the Internet. The determination in this instance may also take into account the speed (i.e. data access rate) across the communicative coupling between the client computing device 110 and the server device 120. For example, the link 1141 may be the uniform resource locator for a multimedia file (e.g. a video) accessible on a server which is connected to the Internet. The determination may compare the speed of the connection to the Internet (or that server in particular) from the client computing device 110 and from the server device 120. If the multimedia file would be accessed more quickly through the connection to the Internet of the client computing device 110 rather than the server device 120, then the determination may be that the resources of the client computing device 110 should be used to access the multimedia file. If it appears that the server device 120 would be able to access the multimedia file more quickly, then the determination may also take into account the speed of the communicative coupling between the server device 120 and the client computing device 110—as the multimedia file will need to be sent from the server device 120 to the client computing device 110 over the communicative coupling even if the resources of the server device 120 are used to access the multimedia file. As will be appreciated, the determination may take into account other resources available to the client computing device 110 and the server device 120—such as the available processing power and memory.

Which resources are used to access the computer file may depend, in embodiments, on the availability of the computer program which is required to display the computer file (for example, if the computer file is a video file, the availability of a computer program which is able to decode and display the video file). As will be appreciated, the client computing device 110 may have one or more different computer programs stored on the or more storage media 111 thereof compared to the server device 120. In embodiments, if a computer program is needed to access the computer file and that computer program is not stored on the one or more storage media 111 of the client computing device 110, then the server device 120 may transmit the computer program (or an installation file associated therewith) to the client computing device 110. Which computer program is required to display the computer file may be assessed based on a file extension of the computer file and/or a header of the computer file.

Which resources are used to access the computer file may depend, in embodiments, on a security requirement associated with the computer file. This security requirement may include a requirement which is imposed by the client computing device 110 or the server device 120. For example, the server device 120 may impose a requirement that a computer file from a particular source (or class of sources—e.g. untrusted or remote sources) are to be accessed on the server device 120. The server device 120 may, for example, include one or more additional computer programs to monitor for malicious computer programs—e.g. a virus, Trojan, etc. Thus, accessing of certain computer files through the server device 120 only may inhibit the operation of a malicious computer program on the system 100 and/or isolate the client computing device 110 from such malicious computer programs. In embodiments, the security requirement may include an access limitation for the computer file. For example, the computer file may include information of a sensitive nature. Accordingly, the access of the computer file by the remote server 120 and the presentation of all or a part of the computer file to the user through the output arrangement 114 may make it more difficult for the computer file to be copied without permission.

As will be appreciated, in embodiments, information is needed regarding the resources which are available to both devices 110, 120 in order for the determination to be made. As such, the device 110,120 making the determination may request information regarding available resources from the other device 110,120. In embodiments, this request is made on the establishment of a connection between the client computing device 110 and the server device 120. In embodiments, the request is periodically repeated. The information is then stored on the requesting device 110,120. As will be understood, both devices 110,120 may simultaneously store information regarding the available resources of the other device 110,120. In embodiments, one of the devices 110, 120 is a master device and is always used to make the determination. In embodiments, the request for information regarding available resources is made as part of the determination—i.e. on an ad-hoc basis.

In embodiments, if the device 110,120 which is executing the computer program which presents the link 1141 to the user is not the device 110,120 which the determination identifies as the device 110,120 to access the computer file to which the link 1141 relates, then the link 1141 or a part thereof is sent to the device 110,120 which is to access the computer file. The computer file itself is not sent between the devices 110,120.

The computer file may, in embodiments, be a multimedia file (such as a video file, a music file, or the like) or a webpage (e.g. an html file). The webpage may be a static or dynamic webpage. Thus, for example, the computer file may be a dynamically created computer file which is generated as the result of a request being sent to a server. The link 1141 may also be, more generally a link to a website, a domain name, or the like, which may be interpreted as a link to computer file (e.g. to an index.html file). In other words, in embodiments the link 1141 to a computer file is, in fact, a link to a storage location for a computer file or a part thereof.

In embodiments, only part of the link is required to access the data stored at the storage location represented by the link and so only part of the link may be sent to the device 110,120 whose one or more resources are to be used—as and when applicable.

In embodiments, which device 110,120 is used to access the computer file may be substantially invisible to the user. In embodiments, the computer file is opened and its content presented to the user through a computer program which displays an application window to the user through the output arrangement 114. The application window may be, for example, provided by the server device 120 on a desktop which is provided by the client computing device 110. In embodiments, a visual indicator is provided on the desktop (and/or the application window) of the device 110,120 which is providing the application window.

Thus, as will be understood, embodiments of the present invention seek to use the most appropriate resources to access a computer file from a link 1141. If the resources of the device 110,120 which is not executing the computer program which presents the link 1141 are to be used to access the link, then sending the link 1141 (or a part thereof) only to the other device 110,120 seeks to minimise any delays and maximise efficiency (particularly, when compared to actually sending the computer file to which the link relates). This helps to provide a seamless arrangement to the user. Thus, the embodiments of the present invention seek to provide a seamless switching between use of the resources of the client computing device 110 and the server device 120.

In embodiments, one or more of the one or more virtual channels which are established when a connection is established between the client computing device 110 and the host computing device 120 are made available for use by support services.

The support services may include a helpdesk service. The support services may be provided by a further client computing device 140. The further client computing device 140 may be communicatively coupled to the server device 120 in much the same manner as the client computing device 110 or may be communicatively coupled to the server device 120 over a trusted network (which may a local or wide area network which is associated with the server device 120 and which allows connection to the server device 120 using conventional network authentication).

In embodiments, in the event that a user experiences problems after having established a connection between the client computing device 110 and the server device 120, the user may request assistance from the support services.

This request may be in the form of an email which uses an Internet connection of the client computing device 110 or may be in the form of a message sent to the server device 120 over the communicative coupling therebetween (e.g. a network message).

The request may be received by the server device 120 and/or by a support services device 150. In embodiments, the further client computing device 140 is communicatively coupled to the server device 120 through the support services device 150 (which may be a server). Thus, in embodiments, the request may be received by the support services device 150 via the server device 120.

The request may be passed by the support services device 150 (or the server device 120 if there is no support services device 150) to the further client computing device 140. In response to receipt of the request, the further client computing device 140 may issue a request to the client computing device 110 for information regarding the configuration of the client computing device 110 (which may include information regarding one or more components of the client computing device 110 as well as one or more computer programs operating on the client computing device 110). The further client computing device 140 may send one or more messages to the client computing device 110 and may receive one or more responses from the client computing device 110 (the messages may be presented to the user of the client computing device 110 through the output arrangement 114 and responses may be input by the user through the input arrangement 113). The messages may be presented to the support services user of the further client computing device 140 through an output arrangement 142 thereof and responses may be input by the support services user through an input arrangement 141—the input and output arrangements 141,142 corresponding with the input and output arrangements 113,114 for the client computing device 110.

In other words, a communication channel may be established between the further client computing device 140 and the client computing device 110 which is used to seek a solution to one or more problems encountered by the user of the client computing device 110 or by the client computing device 110 itself. The communication channel may be via the communicative coupling between the server device 120 and the client computing device 120.

In embodiments, the further client computing device 140 may send a remote access request to the client computing device 110. In response, the client computing device 110 may permit or deny remote access by the further computing device 140. If remote access is permitted, then the further client computing device 140 may establish remote access to the client computing device 110 such that further computing device 140 can instruct one or more operations on the client computing device 110 in much the same manner as can be done through the input arrangement 113 of the client computing device 110. This may be done using the input arrangement 141 of the further client computing device 140. The information presented to the user of the client computing device 110 through the output arrangement 114 of the client computing device 110 may be mirrored in the output arrangement 142 of the further client computing device 140—this may include a desktop and one or more windows, icons, and the like.

The remote access may be achieved by the use of one or more of the virtual channels established between the client computing device 110 and the server device 120. As the client computing device 110 and the server device 120 have already established a connection, no further authentication may be required, in embodiments, to establish the remote access—although the user of the client computing device 110 may be presented with the option to refuse the remote connection.

Thus, the support services user may take control of the client computing device 110 remotely, using the connection which has already been established between the client computing device 110 and the server device 120. The or each virtual channel which is used in this manner to provide remote access is, in effect, used in reverse.

As will be appreciated, according to embodiments, one or more elements of the information which are presented to the user of the client computing device 110 may have originated from the server device 120 and may have been transmitted to the client computing device 110 by the server device 120. The connection between the further client computing device 140 and the client computing device 110 is through the server device 120. Therefore, the information which originates from the server device 120 may, in embodiments, be delivered to the further client computing device 140 from the server device 120 'directly'—in the sense that it has not first been sent from the client computing device 110 to the server device 120. In embodiments, the further client computing device 140 may be configured to transmit a request to the server device 120 and/or the client computing device 110 that the information originating from the server device 120 is, instead, transmitted to the further computing device 140 from the client computing device 110 (via the server device 120). In other words, information (such as the output from a computer program) generated by the server device 120 for the client computing device 110 may be sent to the client computing device 110 and then returned to the server device 120 for onward transmission to the further client computing device 140—as will be understood, this may be needed in order to view, identify and resolve certain issues.

As will be understood, remote access may require a remote access computer program to be executed by the client computing device 110 and may also require a remote access relay computer program to be executed by the server device 120—the two programs interacting to provide the aforementioned functionality.

In embodiments, an activity monitor 160 is provided. The activity monitor 160 may be, as depicted, a server or other computing device which is coupled to the server device 120 or may be integrated in to the server device 120. The activity monitor 160 includes access to one or more data storage media 161. In embodiments, these one or more storage media 161 are part of the activity monitor 160.

The activity monitor 160 is configured to receive information from the client computing device 110 and the server device 120 regarding one or more activities occurring in relation to the client computing device 110. These one or more activities include one or more computer programs which are being presented to the user through the output arrangement 114 of the client computing device 110 and one or more inputs from the user which are input through the input arrangement 113. The one or more inputs may, therefore, include one or more key presses or mouse movements, for example.

The activity monitor 160 may receive this information via the server device 120 (even if the information originates from the client computing device 110).

In embodiments, the activity monitor 160 includes a component in the form of a computer program which is executed by the client computing device 110 and which monitors activity on the client computing device 110. The activity may be activity associated with one or more computer programs which are executed using the resources of the client computing device 110 and/or the server device 120. In embodiments, this component of the activity monitor 160 is configured to store a log of activity information which is stored on one or more of the storage media 111 of the client computing device 120. The stored information may be encrypted. The stored information may be periodically transmitted to other part (or parts) of the activity monitor 160. Thus, as will be appreciated, activity information may be recorded and analysed even if the activity occurred when the client computing device 110 was not connected to other part (or parts) of the activity monitor 160 (e.g. because there is no connection and/or communicative coupling between the devices 120,110). Once transmitted from the client computing device 110, the information may be deleted from the client computing device 110.

Information regarding activities from the client computing device 110 may be merged with information regarding activities from the server device 120 to generate a merged set of information representative of the activities of a user or client computing device 110. In embodiments, the information form the server device 120 relates to activities concerning one or more computer programs executed using the resources of the server device 120.

The activity monitor 160 is configured to store this information in the one or more storage media 161 to which it has access. The stored information may be associated with the client computing device 110 and/or the user of the client computing device 110. As such the information may be stored with an identifier for the client computing device 110 and/or the user of the client computing device 110—as will be appreciated, there may be a plurality of different client computing devices 110 and/or a plurality of different users.

The information stored by the activity monitor 160 may be used to analyse the activity of a particular user or the activity through a particular client computing device 110—for example. The analysis may include the time spent on a particular task, the time spent working by a particular user, the types of computer program executed using a particular client computing device 110, etc. The information stored by the activity monitor 160 may also be used to identify inappropriate activity by a user—for example, non-work related activities during working hours.

The information includes information relating not only to the activities associated with computer programs which are executed using the computing resources of the client computing device 110 but also those which are executed using the computing resources of the server device 120. Thus, the information may represent overall activities by a particular user and/or on a particular client computing device 110 irrespective of whether a particular computer program is being executed by the client computing device 110 or the server device 120.

As will be appreciated, the activity information which is collected by the activity monitor could be used for a variety of different statistical analysis purposes, but could also be used to determine how long a particular user spent at work (and, therefore, how much pay they are due), how long a particular task took (and, therefore, how much to charge for the completion of the task), and the like.

The activity information may be available to the user in embodiments through an interface presented to the user of the client computing device 110 using the output arrangement 114. The activity information may be available to another user (e.g. an administrator) through a different client computing device.

An encryption key for use by the client computing device 110 in relation to the activity information which may be stored thereon may be transmitted to the client computing device 110 by the activity monitor and/or the server device 120 when a connection is established between the two devices 110,120.

Information regarding the activities of a user in relation to one or more first computer programs executed by the client computing device 110 may be first information. Information regarding the activities of a user in relation to one or more second computer programs executed by the server device 120 (under instruction from the client computing device 110) may be second information. Accordingly, the first and second information may be collated, as described, to provide combined activity information associated with the user and/or the client computing device 110.

In embodiments, the server device 120 includes one or more policy computer files stored on the one or more storage media 121 thereof, wherein the one or more computer files include information which determines what a user or group of users can and cannot do in relation to elements of the system 100 and one or more requirements which must be met in relation to the use of the system 100 by a user or group of users.

For example, a user or group of users may be required to use passwords which meet certain requirements. These requirements may be listed in the one or more computer files. A user or group of users may be permitted access to a certain storage medium 121 of the server device 120 but may be prohibited from access to another storage medium 121 of the server device 120. A user or group of users may be permitted to connect a storage medium or type of storage medium to a client computing device 110 or not. A user or group of users may be permitted to establish a connection between their respective client computing devices 110 and the server device 120 only if one or more storage media or types of storage medium are not connected to the client computing device 110. A type of storage medium may be a USB storage medium (e.g. a 'USB memory stick') or a hard disk, for example. This information may be listed in the one or more policy computer files.

In some systems 100 such one or more policy computer files are generally referred to a 'group policy objects'. This name will be used herein for the sake of clarity.

In a conventional network, group policy objects are distributed and associated with user accounts as and when users login to computing devices on the network.

However, in a remote access system, group policy objects are not conventionally distributed to users of client computing devices 110 unless those client computing devices 110 are connected to a trusted network of associated with the server device 120 (which may be local or wide area network). Such group policy objects are not conventionally distributed to client computing devices 110 when those devices 110 connect to the server device 120 from a remote location—e.g. over the Internet.

In embodiments of the present invention, one or more group policy objects are distributed to one or more client computing devices 110 through the server device 120 using the communicative coupling between the client computing devices 110 and the server device 120. In particular, one or more of the virtual channels established between the client computing device 110 and the server device 120 may be used for the transmission of a group policy object.

Thus, if a group policy object is updated, a client computing device 110 can still receive and implement the group policy object even if the client computing device 110 is not connected to the server device 120 through a trusted network—e.g. the connection is over the Internet.

A group policy update may occur when the client computing device 110 establishes a connection with the server device 120.

In embodiments, one of the one or more computer programs which are selectable by the user for execution is a computer program which is executed using the resources of the server device 120. This computer program may be exclusively executable using the resources of the server device 120 such that execution using the resources of the client computing device 110 is prohibited—this exclusive execution may be a rule associated with the computer program.

As will be appreciated, the server device 120 may provide additional security measures over and above those which are available to the client computing device 110 directly. For example, the additional security measures may include a security computer program (or a better security computer program) which is configured to identify malicious computer programs.

By obligating the computer program to be executed using the resources of the server device 120, the additional security measures may be applied to the execution of the computer program.

For example, the computer program may be an Internet browser. Execution of the Internet browser using the resources of the server device 120 includes use of an Internet connection of the server device 120. The server device 120 can, therefore, apply one or more additional security measures to information which is received over that Internet connection as a result of the execution of the computer program (i.e. the Internet browser). As the output of the computer program only is sent to the client computing device 110 for presentation to the user through the output arrangement 114, there is a much lower risk of a malicious computer program being sent to the client computing device 110.

This risk is even lower than if the Internet browser were executed using the resources of the client computing device 110 with the exception of the Internet connection—which may be provided through the server device 120—because the Internet browser would potentially receive data including a malicious computer program which is undetected. Isolation of the Internet browser on the server device 120 with only the output presented to the user, therefore, improves the security of the client computing device 110 even if no other additional security measures are implemented on the server device 120.

In embodiments, a computer program which must be executed using the resources of the server device 120 can also have its usage monitored by activity monitor 160 more readily. Furthermore, the server device 120 may include one or more rules which, for example, limit the usage of that particular computer program—for example, to specific periods of the day (e.g. a lunch break) and/or for specific lengths of time. A user's ability to upload or download one or more computer files through the computer program (which may be an Internet browser) may also be limited—e.g. to prevent or inhibit the uploading or downloading of computer files to a webmail facility for example.

Figure 4:
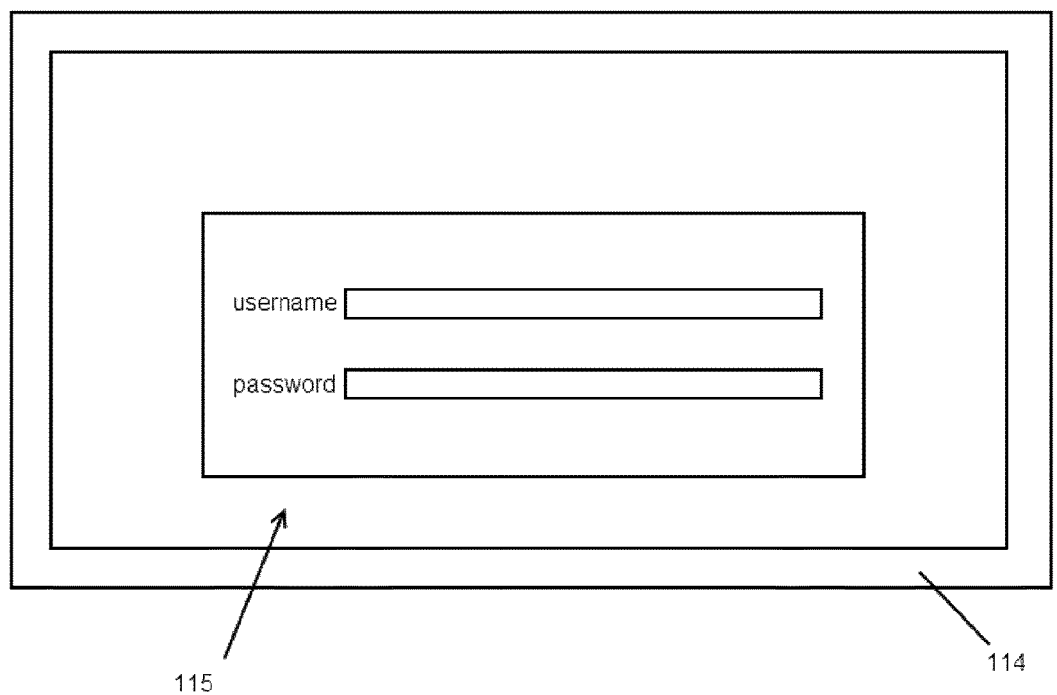
FIG. 4 is an example screen output by an output arrangement of a client device.

In embodiments, the client computing device 110 includes a login shell 115. The login shell 115—see FIG. 4—may be presented to the user through the output arrangement 114 of the client computing device 110. The login shell 115 may be configured to receive one or more inputs from a user through the input arrangement 113. The one or more inputs may include, for example, a username and password.

In embodiments, on the start up (e.g. powering up) of the client computing device 110, the client computing device 110 is configured to determine whether or not there is a communicative coupling to the server device 120 before the login shell 115 is presented to the user. If there is a communicative coupling, then the client computing device 110 may authenticate itself with the server device 120 in a first level of a multi-level authentication process (as discussed above). If the first level of authentication is successful, then the login shell 115 may be presented to the user—the login shell 115 may then prompt the user to enter a username and password or other user identification. The user may then enter information into the login shell 115 which is then used in a second level of authentication (i.e. a user-level authentication) to establish the connection between the client computing device 110 and the server device 120. If there is no communicative coupling between the devices 110,120, then a different login shell may be presented to the user—through which access to the client computing device alone can be achieved. The different login shell may also allow the user to enter a username and password—which are then verified against one or more user profiles stored on the client computing device 110 before access to the client computing device 110 is permitted.

The login shell 115 may, once the connection has been established, implement other aspects of the invention—for example, providing a desktop for presentation to the user including a list of one or more computer programs and/or computer files. The login shell 115 may, therefore, present a desktop as an alternative to a desktop which would otherwise be presented by an operating system of the client computing device 110.

The login shell 115 may provide one or more user configurable options which allow a user to set different display and configuration properties of the login shell 115—e.g. resolution, colour, layout, etc. The one or more user configurable options may be stored one the client computing device 110 and/or may be uploaded to the server device 120 (and downloaded to the client computing device 110 when a connection is established).

When a computer program is executed using the resources of the client computing device 110 or the server device 120, then the execution of the computer program may involve accessing one or more computer files stored on either the client computing device 110 or the server device 120. The or each such computer file may be associated with a parameter which indicates whether or not the or each computer file can be transferred from its current device 110,120 to the other device 110,120. In embodiments of the present invention, only a computer file which is associated with a parameter which does not indicate that the computer file cannot be transferred, can be transferred (e.g. copied or moved) to the other device 110,120. The client computing device 110 and/or server device 120 may be configured to prevent the transfer of one or more computer files accordingly.

The parameter associated with a computer file may be stored with the computer file—e.g. in a header thereof—or may be stored in an independent list in the client computing device 110 and/or the server device 120 and associated with an identifier for the computer file.

In embodiments, a user may be able to set the parameter. In embodiments, only an administrator can set the parameter.

In embodiments, if the parameter for a computer file indicates that the file is not to be transferred, then transfer may be prevented through the one or more virtual channels of the communicative coupling between the client computing device 110 and the server device 120. In embodiments, the computer file may still be transferable through another means—e.g. using a file transfer protocol or by email. As will be understood, such other means may be monitored by the server device 120 and transfers reported and/or recorded in relation to the user and/or client computing device 110.

In embodiments, a client computing device 110 is configured to request a backup copy of one or more computer files or folders from the server device 120. The server device 120 is configured to send the one or more requested computer files or folders to the client computing device 110 for storage thereon. In embodiments, this procedure can be requested by another user (e.g. an administrator).

One or more firewalls may be used to protect one or more of the client computing device 110, the server device 120, and the application deployment server 180. One or more other firewalls may be used to protect one or more other components of the system 100. Accordingly, a first firewall 190 may isolate the client computing device 110 from a network (such as the Internet). The first firewall may have no open incoming ports. A second firewall 191 may isolate the server device 120 from a network (such as the Internet). The second firewall 191 may have open incoming SSL and UDP ports. A third firewall 192 may isolate the application deployment server 180 from a network (such as the Internet). The third firewall 192 may have open incoming SSL and UDP ports. The open ports may include the following ports: TCP 3389, UDP 3389, and 443 TCP.

As used herein a 'computer program' may be a software application include, for example, an Internet browser, a program configured to play a multimedia file, a word processing program, a spreadsheet program, a database program, an interface for a software compiler, a drawing program, a CAD program, an email program, an accounting program, and the like (to name but a few). A computer program may output a user interface through which a user can interact with the operation of the computer program. As will be appreciated, a computer program may host (i.e. control and manage the operation of) another computer program and may comprise a suite of computer programs.

An 'installation file' as used herein may be a reference to a Windows® installer or a Microsoft® installer, or an equivalent for another operating system.

References to a 'client computing device' as used herein may encompass one or more of a laptop computing device, a desktop computing device, a tablet computing device, a telephone computing device, and like.

References to a 'storage medium' as used herein may encompass one or more of a magnetic storage medium (such as a hard disk), an optical storage medium, an integrated circuit memory device (such as a flash memory device), and the like.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of providing support services to a client computing device for solving at least one problem encountered by the client computing device in response to a user requesting assistance to the problem encountered with the client computing device, the method comprising:
   establishing a remote access connection between the client computing device and a server device such that one or more resources of the server device are useable by the client computing device in execution of one or more computer programs of the server device, the remote access connection including one or more virtual channels;
   sending an assistance request from the client computing device to a support services device in response to a problem encountered by the client computing device, the support services device being connected to the server device;
   providing, by a further client computing device, remote access to the client computing device, the further client computing device being connected to the server device and remotely controls the client computing device, the providing of the remote access to the client computing device by the further client computing device being in response to receipt of the assistance request by the support services device, wherein remote access is provided via one or more of the one or more virtual channels;
   issuing, by the further client computing device, a request for configuration information of the client computing device, the configuration information of the client computing device including at least one of components of the client computing device and computer programs operating on the client computing device;
   receiving, by the further client computing device, the configuration information requested from the client computing device;
   analyzing, by the further client computing device, the received configuration information of the client computing device;
   determining, by the further client computing device, a solution to the problem encountered by the client computing device in view of the analyzed configuration information of the client computing device;
   accessing the client computing device with the further client computing device utilizing the remote access connection between the client computing device and the server device; and
   providing a computer file to the client computing device by the remote access connection between the client computing device and the server device, the computer file executable on the client computing device and including instructions to solve the problem encountered by the client computing device, the computer file being associated with a transfer permitting parameter that indicates that the computer file can be transferred to the client computing device from the server device.

2. A method according to claim 1, wherein providing remote access includes providing information from the execution of one or more computer programs by the client computing device and/or the server device.

3. A method according to claim 1, wherein providing remote access includes providing information from the execution of one or more computer programs by the client computing device and/or the server device; and at least one of the one or more computer programs is a computer program executed by the server device for the client computing device.

4. A method according to claim 1, wherein providing remote access includes providing information from the execution of one or more computer programs by the client computing device and/or the server device, wherein at least one of the one or more computer programs is a computer program executed by the server device for the client computing device; and the information from the at least one computer program is delivered directly from the server device to the further client computing device.

5. A method according to claim 3, wherein providing remote access includes providing information from the execution of one or more computer programs by the client computing device and/or the server device, wherein at least one of the one or more computer programs is a computer program executed by the server device for the client computing device; and the information from the at least one computer program is delivered to the further client computing device via the client computing device.

6. A method according to claim 1, wherein the support services device is the further client device.

7. A method according claim 1, wherein providing remote access includes providing information from the execution of one or more computer programs by the client computing device and/or the server device, wherein the support services device is the further client device.

8. A method according to claim 1, wherein providing remote access includes providing information from the execution of one or more computer programs by the client computing device and/or the server device; and at least one of the one or more computer programs is a computer program executed by the server device for the client computing device, wherein the support services device is the further client device.

9. A method of providing support services to a client computing device for solving at least one problem or more problems encountered by the client computing device in response to a user requesting assistance to the problem encountered with the client computing device, the method comprising:
   establishing a remote access connection between the client computing device and a server device such that one or more resources of the server device are useable by the client computing device in execution of one or more computer programs of the server device, the remote access connection including one or more virtual channels;
   receiving an assistance request at a support services device from the client computing device in response to a problem encountered by the client computing device, the support services device being connected to the server device;
   providing, by a further client computing device, remote access to the client computing device, the further client computing device being connected to the server device and remotely controls the client computing device, the providing of the remote access to the client computing device by the further client computing device being in response to receipt of the assistance request by the support services device, wherein remote access is provided via one or more of the one or more virtual channels;

issuing, by the further client computing device, a request for configuration information of the client computing device, the configuration information of the client computing device including at least one of components of the client computing device and computer programs operating on the client computing device;

receiving, by the further client computing device, the configuration information requested from the client computing device;

analyzing, by the further client computing device, the received configuration information of the client computing device;

determining, by the further client computing device, a solution to the problem encountered by the client computing device in view of the analyzed configuration information of the client computing device;

accessing the client computing device with the further client computing device utilizing the remote access connection between the client computing device and the server device; and providing a computer file to the client computing device by the remote access connection between the client computing device and the server device, the computer file executable on the client computing device and including instructions to solve the problem encountered by the client computing device, the computer file being associated with a transfer permitting parameter that indicates that the computer file can be transferred to the client computing device from the server device.

10. A client computing device configured to operate in a remote access system, the client computing device connected to a server device, wherein the user may request assistance to a problem encountered with the client computing device, the client computing device comprising:

memory; and a processor configured to:

establish a remote access connection between the client computing device and the server device such that one or more resources of the server device are useable by the client computing device in execution of one or more computer programs of the server device, the remote access connection including one or more virtual channels;

send an assistance request from the client computing device to a support services device in response to a problem encountered by the client computing device, the support services device being connected to the server device;

provide, by a further client computing device, remote access to the client computing device for providing support services to the client computing device for solving one or more problems encountered by the client computing device, the further client computing device being connected to the server device and remotely controls the client computing device, the remote access to the client computing device by the further client computing device being provided in response to receipt of the assistance request by the support services device, wherein remote access is provided via one or more of the one or more virtual channels;

issue, by the further client computing device, a request for configuration information of the client computing device, the configuration information of the client computing device including at least one of components of the client computing device and computer programs operating on the client computing device;

receive, by the further client computing device, the configuration information requested from the client computing device;

analyze, by the further client computing device, the received configuration information of the client computing device;

determine, by the further client computing device, a solution to the problem encountered by the client computing device in view of the analyzed configuration information of the client computing device;

access the client computing device with the further client computing device utilizing the remote access connection between the client computing device and the server device; and provide a computer file to the client computing device by the remote access connection between the client computing device and the server device, the computer file executable on the client computing device and including instructions to solve the problem encountered by the client computing device, the computer file being associated with a transfer permitting parameter that indicates that the computer file can be transferred to the client computing device from the server device.

11. A server device configured to operate in a remote access system, the server device connected to a client computing device, wherein the user may request assistance to a problem encountered with the client computing device, the server device comprising:

memory; and a processor configured to:

establish a remote access connection between the client computing device and the server device such that one or more resources of the server device are useable by the client computing device in execution of one or more computer programs of the server device, the remote access connection including one or more virtual channels;

receive an assistance request at a support services device from the client computing device in response to a problem encountered by the client computing device, the support services device being connected to the server device; and provide, by a further client computing device, remote access to the client computing device for providing support services to the client computing device for solving one or more problems encountered by the client computing device, the further client computing device being connected to the server device and remotely controls the client computing device, the remote access to the client computing device by the further client computing device being provided in response to receipt of the assistance request by the support services device, wherein remote access is provided via one or more of the one or more virtual channels;

issuing, by the further client computing device, a request for configuration information of the client computing device, the configuration information of the client computing device including at least one of components of the client computing device and computer programs operating on the client computing device;

receiving, by the further client computing device, the configuration information requested from the client computing device;

analyzing, by the further client computing device, the received configuration information of the client computing;

determining, by the further client computing device, a solution to the problem encountered by the client computing device in view of the analyzed configuration information of the client computing device;

accessing the client computing device with the further client computing device utilizing the remote access connection between the client computing device and the server device; and providing a computer file to the client computing device by the remote access connection between the client computing device and the server device, the computer file executable on the client computing device and including instructions to solve the problem encountered by the client computing device, the computer file being associated with a transfer permitting parameter that indicates that the computer file can be transferred to the client computing device from the server device.

\* \* \* \* \*

UNITED STATES PATENT AND TRADEMARK OFFICE
CERTIFICATE OF CORRECTION

PATENT NO. : 10,447,818 B2
APPLICATION NO. : 14/646265
DATED : October 15, 2019
INVENTOR(S) : William Yip et al.

Page 1 of 1

It is certified that error appears in the above-identified patent and that said Letters Patent is hereby corrected as shown below:

In the Claims

Column 34, Lines 44-45:
Change "at least one problem or more problems encountered" to --at least one problem encountered--

Signed and Sealed this
Nineteenth Day of November, 2019

Andrei Iancu
*Director of the United States Patent and Trademark Office*